(12) United States Patent
Alte et al.

(10) Patent No.: US 6,501,042 B2
(45) Date of Patent: Dec. 31, 2002

(54) APPARATUS AND PROCESS FOR ASSEMBLING EXHAUST PROCESSOR COMPONENTS

(75) Inventors: Michael C. Alte, Greenwood, IN (US); Jeffrey S. Englert, Shelbyville, IN (US)

(73) Assignee: Arvin Technologies, Inc., Farmington Hills, MI (US)

( * ) Notice: Subject to any disclaimer, the term of this patent is extended or adjusted under 35 U.S.C. 154(b) by 0 days.

(21) Appl. No.: 09/956,194

(22) Filed: Sep. 19, 2001

(65) Prior Publication Data

US 2002/0033385 A1 Mar. 21, 2002

Related U.S. Application Data

(60) Provisional application No. 60/234,444, filed on Sep. 21, 2000.

(51) Int. Cl.[7] ............................................... B23K 10/00
(52) U.S. Cl. ........................... 219/121.46; 219/121.45; 219/121.54; 219/137 R; 219/124.02
(58) Field of Search ..................... 219/121.59, 121.48, 219/121.45, 121.46, 121.54, 121.57, 124.02, 137 R; 29/890.08

(56) References Cited

U.S. PATENT DOCUMENTS

| | | | |
|---|---|---|---|
| 3,984,207 A | 10/1976 | Abthoff et al. | |
| 4,168,406 A | 9/1979 | Torrani | |
| 5,009,513 A | 4/1991 | Onodera et al. | |
| 5,829,132 A | 11/1998 | Sickels et al. | |
| 5,909,527 A | 6/1999 | Zheng | |
| 5,961,858 A | 10/1999 | Britnell | |

FOREIGN PATENT DOCUMENTS

| | | |
|---|---|---|
| EP | WO 97/49519 | 12/1997 |
| EP | 1 074 704 A2 | 7/2001 |

*Primary Examiner*—Mark Paschall
(74) *Attorney, Agent, or Firm*—Barnes & Thornburg

(57) ABSTRACT

An apparatus and method for producing an exhaust processor comprising: a clamping device for applying a predetermined clamping pressure to clamp a case or other component of the exhaust processor about a substrate or other component of the exhaust processor to define a gap between the case and substrate; a measuring device for measuring a size of the gap during application of the predetermined clamping pressure, the measuring device including a clamping pressure control system for adjusting the predetermined clamping pressure of the clamping device in response to the gap measurement so that the gap size is within a predetermined range; and a welder for welding a portion of the case component to an other portion of the caset when the gap size is within the predetermined range. The measuring device also includes a camera for measuring the gap size. The measuring device measures the size of the gap by taking gap measurements at a plurality of predetermined locations about the second component and averages these measurements.

20 Claims, 15 Drawing Sheets

APPARATUS AND PROCESS FOR ASSEMBLING EXHAUST PROCESSOR COMPONENTS

This application claims the benefit of priority of U.S. Provisional Patent Application No. 60/234,444, filed Sep. 21, 2000 entitled "APPARATUS AND PROCESS FOR ASSEMBLING EXHAUST PROCESSOR COMPONENTS."

BACKGROUND AND SUMMARY OF THE INVENTION

The present invention relates to an apparatus and method for producing an exhaust processor configured to treat emissions from combustion product produced by an engine and particularly to an apparatus and method for assembling exhaust processor components. More particularly, the present invention relates to an apparatus and method for measuring and adjusting a gap between an exhaust processor substrate or filter and an exhaust processor case around the substrate.

For environmental reasons, engine combustion product or exhaust must be cleaned on board a vehicle before it is expelled into the atmosphere. This processing is accomplished by passing the untreated combustion product produced by the engine through an exhaust processor to minimize unwanted emissions.

Many exhaust processors include catalytic convertors that are used to filter contaminants from hot combustion product discharged from an engine exhaust manifold. Within a catalyzed exhaust processor, the combustion product is treated by a catalyzed ceramic or metal substrate or converter which converts the exhaust gases discharged from the engine primarily into carbon dioxide, nitrogen, and water vapor. The catalytic converter treats engine combustion product to produce an exhaust stream meeting stringent state and federal environmental regulations and emission standards.

After processing, the treated combustion product is then routed to a muffler to attenuate the noise associated with the combustion. It is also known to provide exhaust processors that include substrates that function as particulate traps to filter contaminant particulates without using a catalyst.

An exhaust processor typically includes a substrate encased within a metal sheet. The size and contour of the exhaust processors depends, in large part, on the space available for the exhaust processor in the vehicle exhaust system on the underside of the vehicle. Exhaust processors are well known as shown, for example, in U.S. Pat. No. 5,829,132 to Sickels et al; U.S. Pat. No. 5,293,743 to Usleman et al.; U.S. Pat. No. 5,118,476 to Dryer et al.; U.S. Pat. No. 4,160,010 to Ottle; U.S. Pat. No. 3,984,207 to Abthoff et al.; and U.S. Pat. No. 3,972,687 to Frietzsche, German Patent No. 3 430 398, and International (PCT) Application Publication No. WO 99/14119, entitled "Apparatus and Method for Encasing an Object in a Case" and published on Mar. 25, 1999, the disclosures of which are incorporated by reference herein.

The present invention provides an apparatus for producing an exhaust processor comprising: a clamping device for applying a predetermined clamping pressure to clamp a first component of the exhaust processor about a second component of the exhaust processor to define a gap between the first component and the second component; a measuring device for measuring a size of the gap during application of the predetermined clamping pressure, the measuring device including a clamping pressure control system for adjusting the predetermined clamping pressure of the clamping device in response to the gap measurement so that the gap size is within a predetermined range; and a welder for welding a portion of the first component to an other portion of the first component when the gap size is within the predetermined range. The first component desirably is a case or other component of the exhaust processor and the second component desirably is a substrate or other component of the exhaust processor. A substrate mat or the like desirably is wrapped around the substrate and substantially fills the gap.

In a preferred embodiment, the measuring device also includes a camera for measuring the gap size. Desirably, the measuring device measures the size of the gap by taking gap measurements at a plurality of predetermined locations about the second component and averages these measurements to obtain the gap size. The control system preferably signals the clamping device to adjust the clamping pressure if the size of the gap measured by the measuring device is outside the predetermined range. The welder, if desired, may be a plasma welder.

The present invention also provides a method for producing an exhaust processor comprising the steps of: (a) applying a predetermined clamping pressure with a clamping device to clamp a first component of the exhaust component about a second component of the exhaust processor to define a gap between the first component and the second component; (b) measuring a size of the gap with a measuring device having a clamping pressure control system for adjusting the predetermined clamping pressure; (c) adjusting the clamping pressure with the clamping pressure control system if the size of the gap is outside a predetermined range; and (d) welding a portion of the first component to an other portion of the first component with a welder when the gap size is within the predetermined range. Desirably, steps (b) and (c) occur during step (a). In a preferred embodiment, the measuring device measures the size of the gap with a camera. The measuring device may make gap measurements at a plurality of predetermined locations about the second component and, if desired, average the gap measurements to determine the gap size. In a preferred embodiment, during step (d) the welder generates plasma for welding the portion of the first component to the other portion of the first component.

Additional features of the invention will become apparent to those skilled in the art upon consideration of the following detailed description of referred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
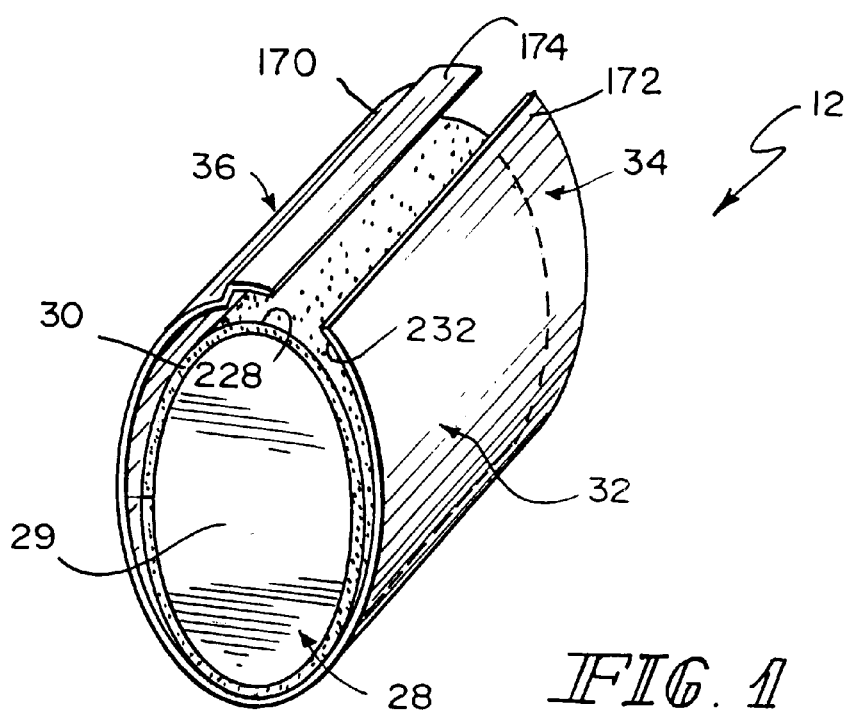
FIG. 1 is a perspective view of an unassembled exhaust processor body including a substrate having an oval-shaped inlet end formed to receive contaminated engine combustion product therein, a mat wrapped around an exterior surface of the substrate, and an outer casing including spaced-apart ends arranged to extend partly around the mat before the ends are mated and welded during manufacture of the exhaust processor body.

An encasement machine 10 is provided to clamp a case about an object to press and fasten the case about the object. The encasement machine clamps cases about objects of various contours and sizes and includes a gap-measurement and gap-adjustment system that is configured to cause the gap between the object and the case clamped around the object to be adjusted until the gap falls within a predetermined dimension range. The encasement machine then operates to fasten the case in a fixed position around the object to set the gap at a fixed dimension within the predetermined dimension range.

In FIGS. 5–15, the "object" is a component of an exhaust processor body 12 used in a vehicle exhaust system (not shown) and the illustrated encasement machine 10 is in the form of a "tourniquet-wrap" machine adapted to clamp a sheet metal case 32 about the component of the exhaust processor body 12 using a spacer 22 that is selected to match the particular shape of the processor body 12. The exterior size and contour of the exhaust processor body 12 may vary depending on the particular vehicle for which the exhaust processor body is intended because exhaust processor bodies typically are adapted to the configuration of the floor pan of the vehicle.

The encasement machine 10 may have any suitable construction and configuration. In the embodiment of FIGS. 5–15, for example, the encasement machine 10 includes a spacer mount 20 that clamps the exhaust processor body 12 and a spacer 22 positioned between the body 12 and spacer mount 20 to position the spacer mount 20 at a selected distance from the body 12. The spacer includes a surface 52 facing the body 12 that has a contour that is substantially similar to the contour of the body 12 to be clamped. The spacer 22 used in the encasement machine is selected to match the size and exterior contour of the particular exhaust processor body 12 to be produced and, in the illustrated embodiment, includes a set of spacer members 46.

Figure 3:
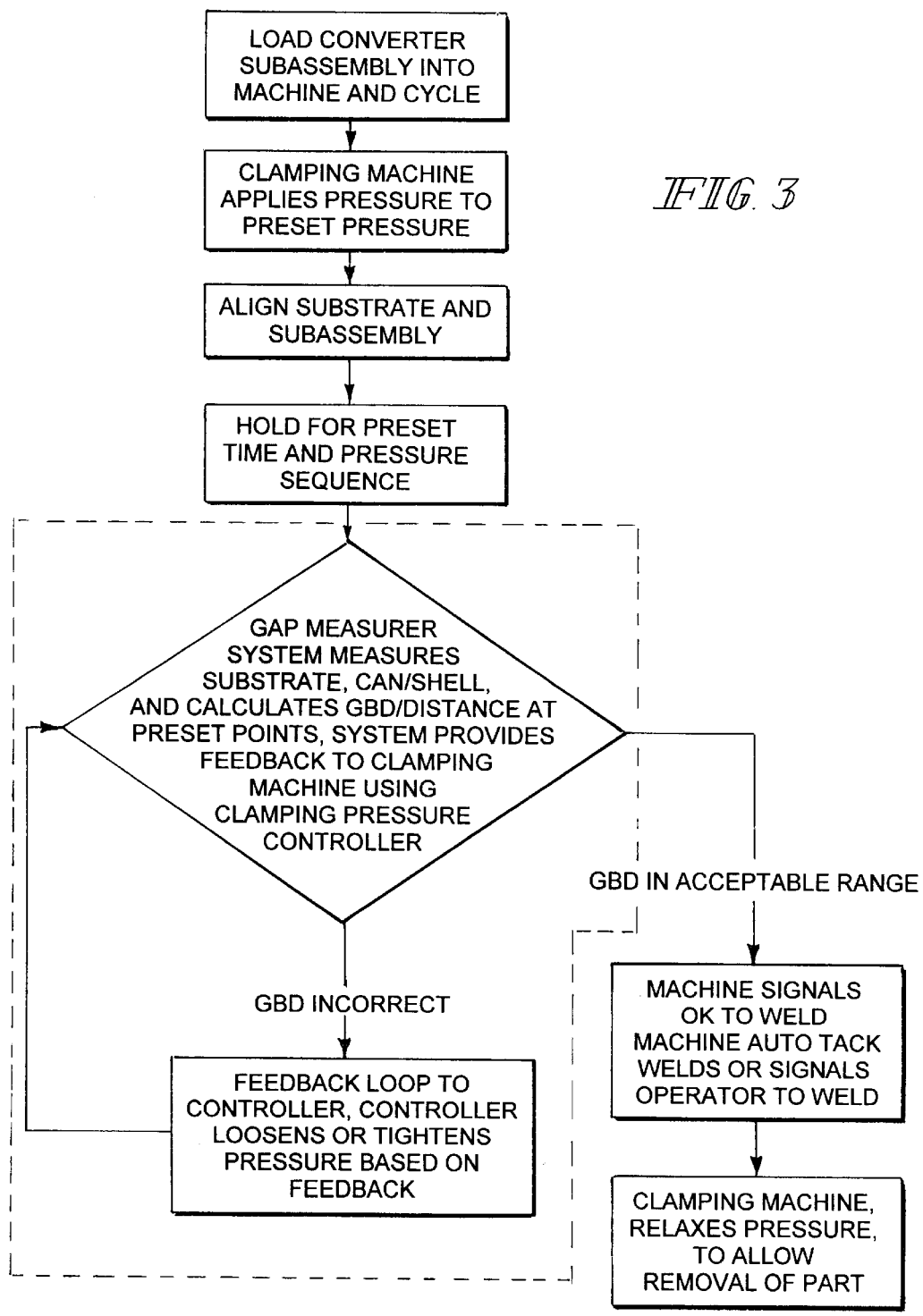
FIG. 3 is a schematic diagram of an apparatus and process for assembly of exhaust processor components in accordance with an embodiment of the invention.
Figure 4:
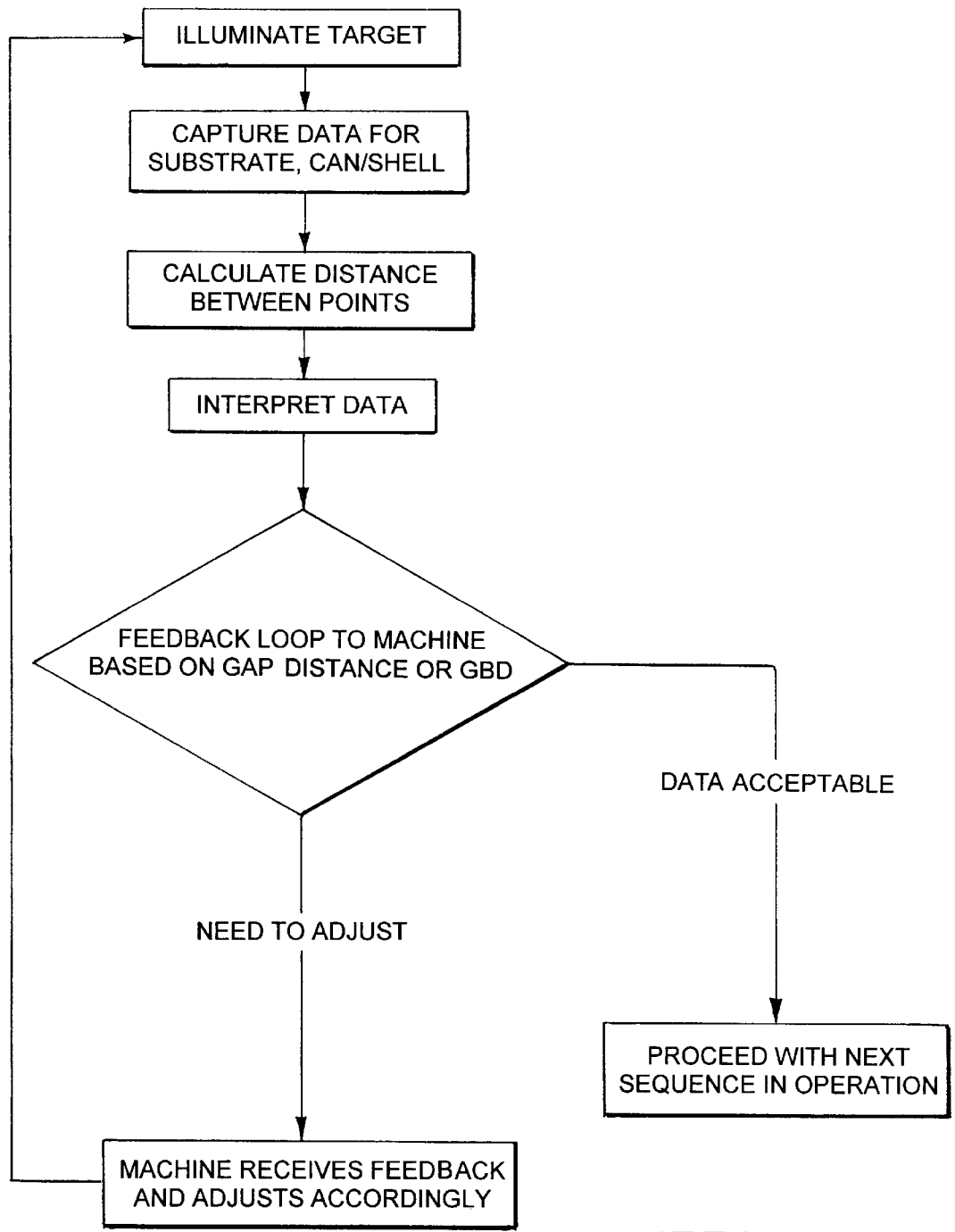
FIG. 4 is a schematic diagram of the gap measurer illustrated schematically in FIG. 3.

The outer case 32 of a partly assembled exhaust processor body 12 of the type shown in FIG. 1 can be tightened (and/or loosened) and welded to set the gap lying between case 32 and a substrate 28 and containing a compressible substrate support mat 30 using the encasement machine 10 (shown, for example, in FIGS. 5 and 8) and its clamping machine 210, a gap measurer 212 having a clamping pressure control system 214, and a welder 90 so that the gap falls within an acceptable predetermined dimension range. Schematic diagrams illustrating a presently preferred process of operating clamping machine 210, gap measurer 212, and welder 90 to set the gap between the substrate 28 and outer case 32 in accordance with the present invention are provided in FIGS. 3 and 4. The welder 90 may be in any suitable form and may have any suitable construction. It desirably is automated. The illustrated welder 90 comprises a pair of laser-guided TIG torches.

Figure 2:
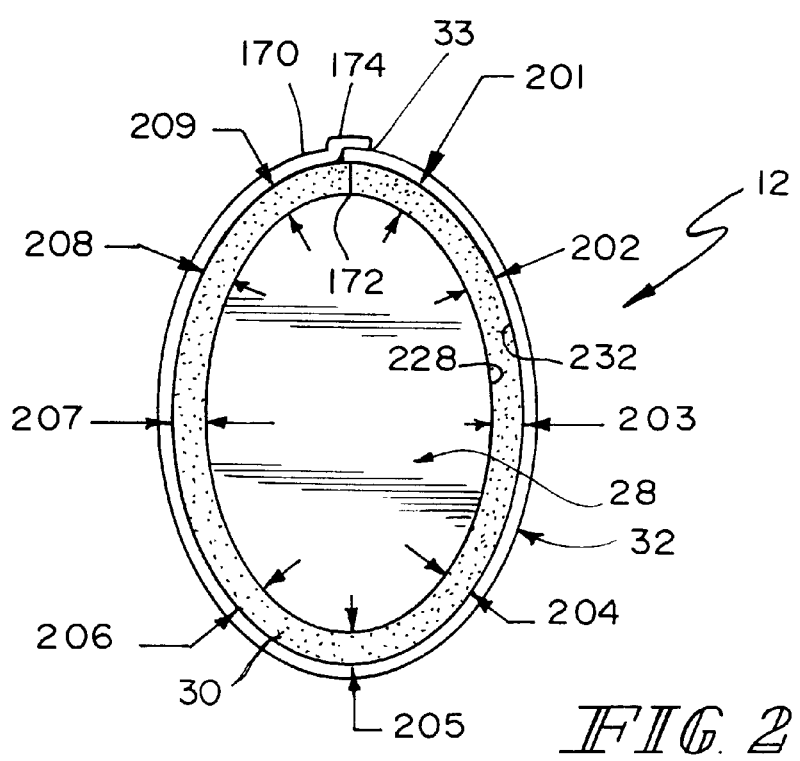
FIG. 2 is an end view of the exhaust processor body of FIG. 1 after assembly showing a gap between the exterior surface of the substrate and an interior surface of the casing and showing that the mat wrapped about the substrate fills the gap and showing, for example, nine gap-measurement points around the exterior surface of the substrate.
Figure 13:
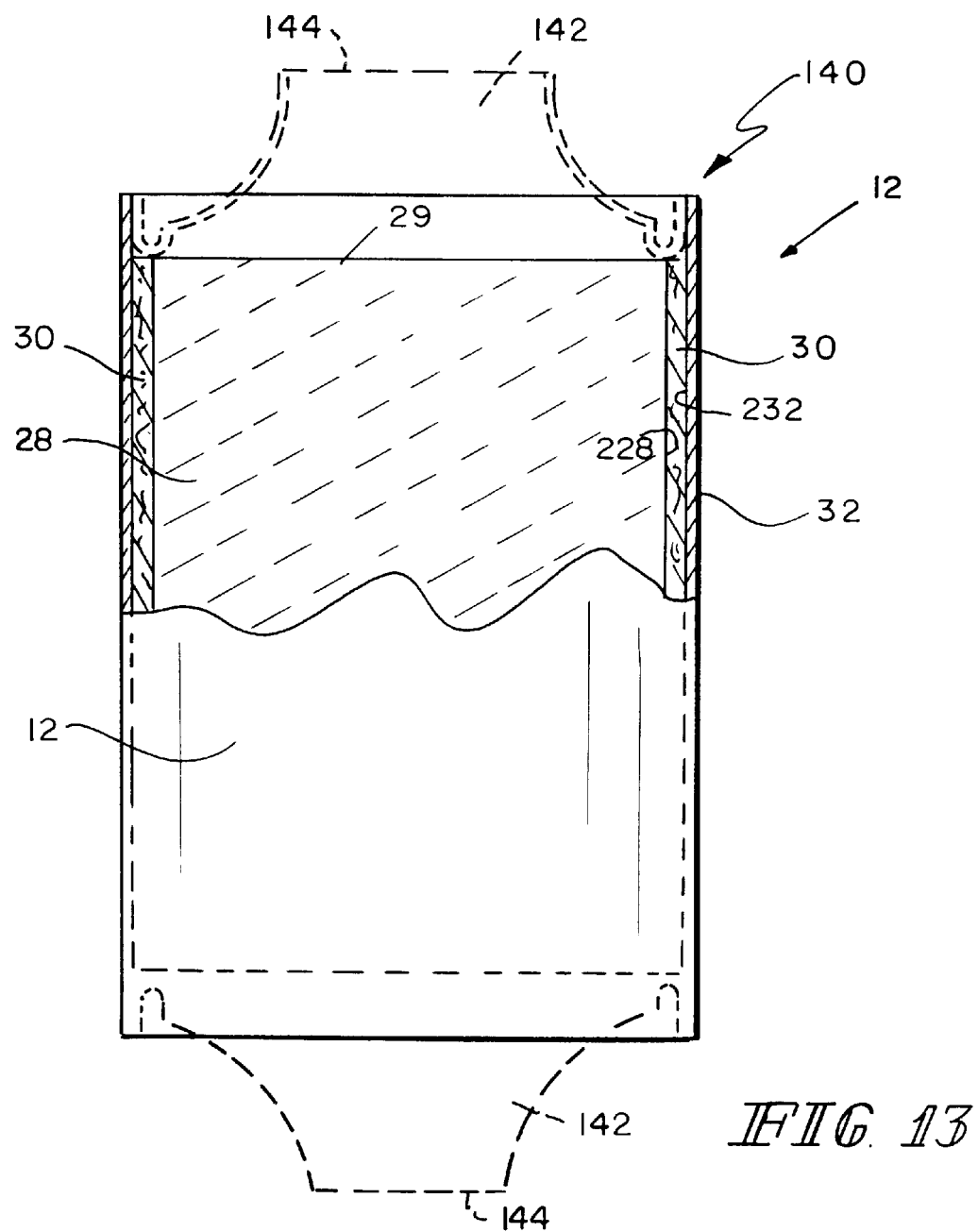
FIG. 13 is a side elevation view, with portions broken away, of an exhaust processor including an exhaust processor body and spaced-apart first and second end caps (in phantom) positioned to abut an inner surface of the case and showing a gap located between the substrate and the outer case and filled with the substrate support mat.

As shown in FIGS. 1, 2, and 13, the exhaust processor body 12 may include the substrate 28, a substrate support mat 30 or other suitable material or substance wrapped around substrate 28, and the outer case 32 placed around mat 30. Substrate 28 may be a catalytic converter, particulate trap, or other suitable contaminant filter able to filter contaminants from combustion product exhausted from an engine. Mat 30 may be made of a compressible intumescent material to support substrate 28 within outer case 32. Outer case 32 may be made of sheet metal. Once outer case 32 is fastened in place around mat 30 as by welding using weldment 33, a gap is created around substrate 28 and between an exterior surface 228 of substrate 28 and an interior surface 232 of outer case 32 as shown, for example, in FIGS. 2 and 13.

Because substrate support mat 30 is compressed during installation of outer case 32 around mat 30 and mat 30 substantially fills the gap between substrate 28 and outer case 32, the dimension associated with the gap is also a measure of the thickness and density of the compressed mat 30 and is called the "Gap Bulk Density" (GBD). Outer case 32 can be wrapped around mat 30 to compress mat 30. Substrate 28 and mat 30 also can be stuffed into a can defined by outer case 32 to compress mat 30. An exhaust processor body 12 having a substrate support mat 30 in compliance with a predetermined Gap Bulk Density specification can be produced by controlling the gap between substrate 28 and outer case 32 during installation of outer case 32 around mat 30 and before outer case 32 is fastened in place around mat 30.

Figure 5:
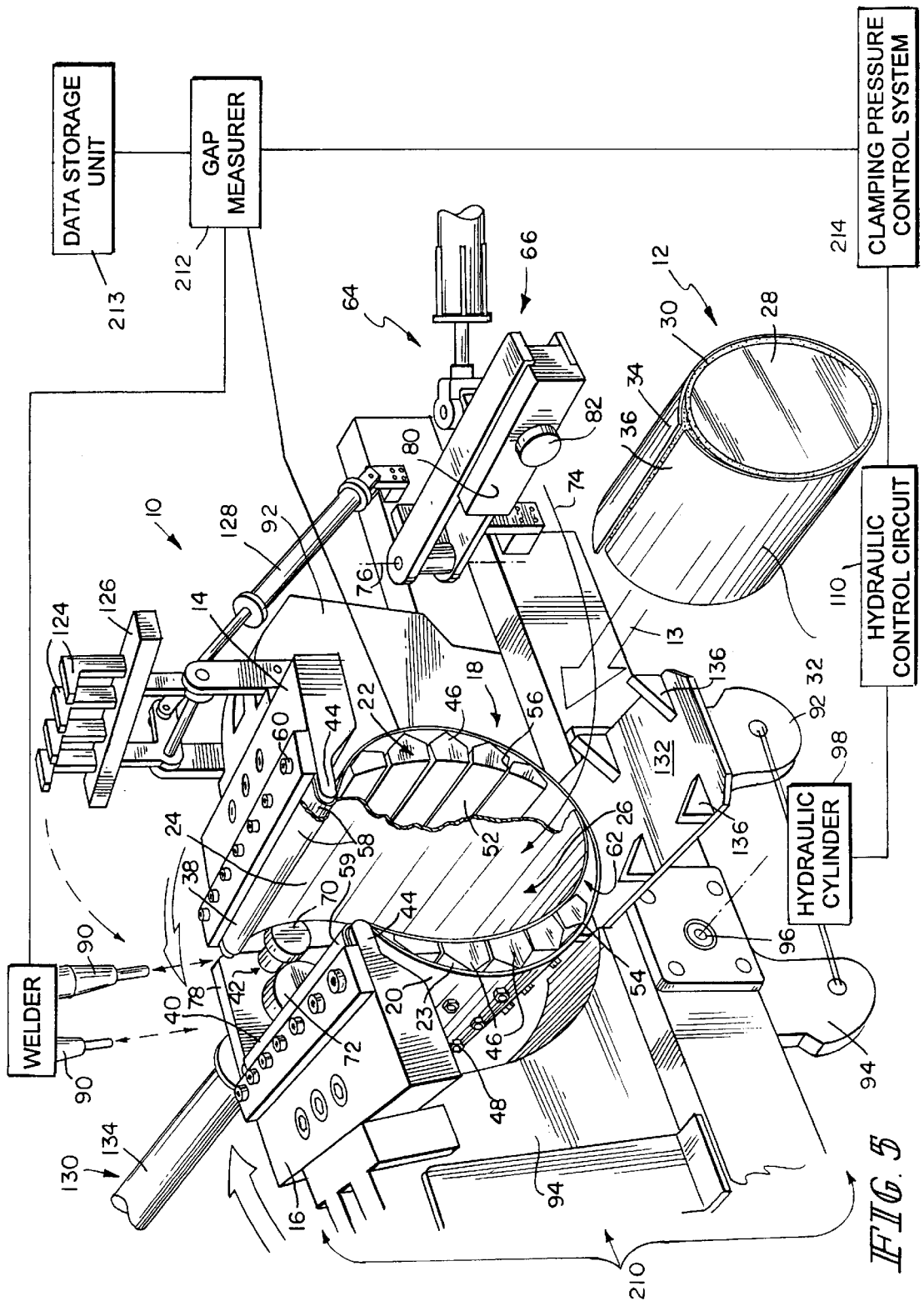
FIG. 5 is an exploded perspective view of an encasement machine in accordance with an embodiment of the invention and an exhaust processor body including an outer case loosely wrapped around a substrate and mat, the encasement machine including a welder, a gap measurer, a clamping pressure control system, and a clamping machine, the clamping machine including spaced-apart jaws and a "horseshoe-shaped" strap unit positioned to extend between the spaced-apart jaws and formed to define an encasement region sized to receive the exhaust processor body so that the body can be clamped in the clamping machine during welding on the body and the gap measurer being arranged to measure a gap between the substrate and the outer case and to communicate gap-measured information to the clamping pressure control system to cause the jaws to move toward or away from one another to tighten or loosen the outer case around the substrate and mat until the gap falls within a predetermined dimension range and before the body is welded by the welder.
Figure 6:
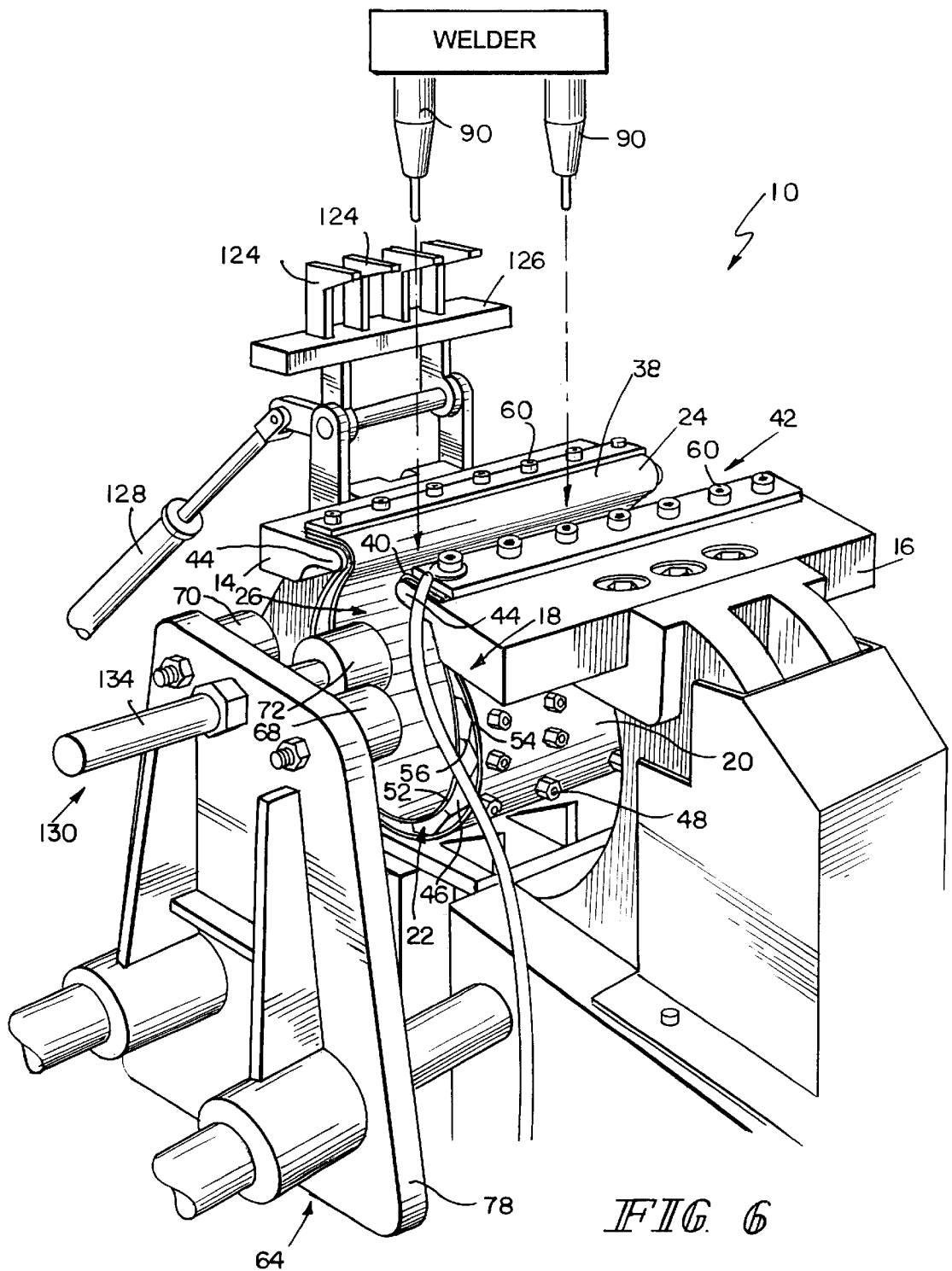
FIG. 6 is another perspective view of a portion of the encasement machine of FIG. 5 prior to insertion of an exhaust processor body into the encasement region formed in the encasement machine.
Figure 7:
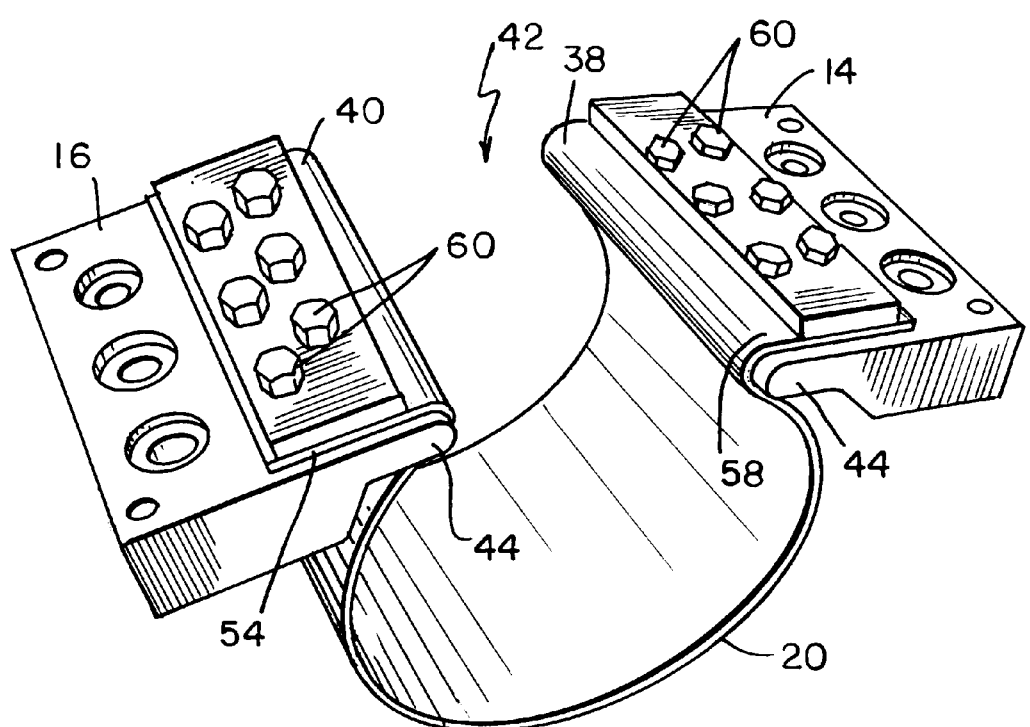
FIG. 7 is a perspective view of a portion of the clamping machine showing the horseshoe-shaped strap unit and a portion of the spaced-apart jaws supporting the strap unit shown in FIGS. 5 and 6.

An embodiment of the encasement machine 10 used to clamp an exhaust processor body 12 is shown, for example, in FIGS. 5 and 6. The illustrated encasement machine 10 includes first and second clamp jaws 14, 16 and a strap unit 18 that extends between jaws 14, 16. First and second clamp jaws 14, 16, strap unit 18, and other components of encasement machine 10 (e.g., jaw levers 92, 94; hydraulic cylinder 98; and hydraulic control circuit 110) cooperate to define the clamping machine 210 that clamps outer case 32 around the mat 30 that is wrapped around substrate 28.

Figure 8:
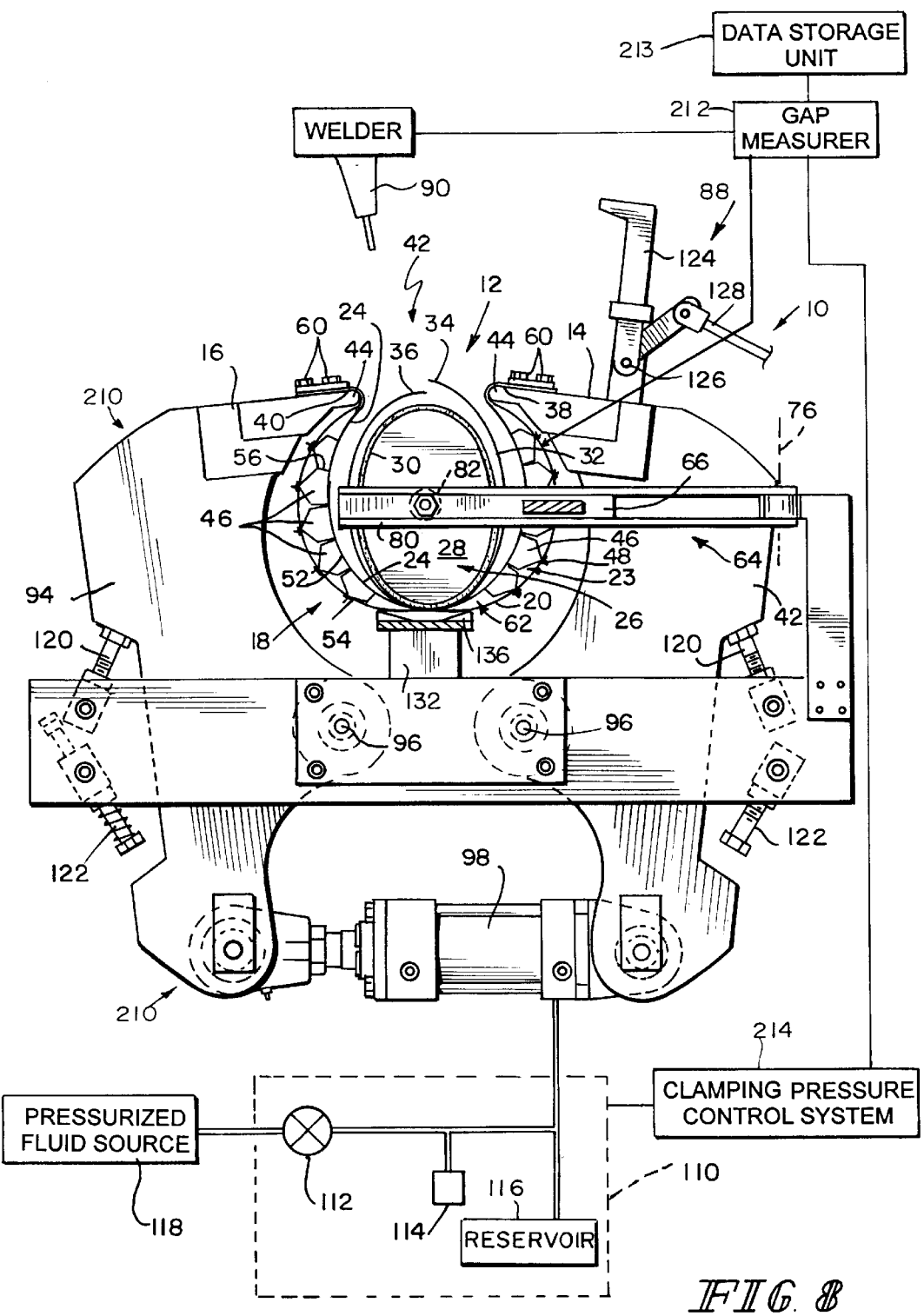
FIG. 8 is a side elevation view of the encasement machine of FIGS. 5 and 6 showing the exhaust processor body positioned in an encasement region defined by the strap unit and between the spaced-apart jaws while the outer case is wrapped loosely around the substrate prior to clamping the exhaust processor body in the encasement region.

Strap unit 18 includes a spacer mount 20 that extends between jaws 14, 16, a wall 24 that extends between jaws 14, 16, and a spacer 22 coupled to spacer mount 20 as shown, for example, in FIGS. 5 and 8. Spacer mount 20 and wall 24 define a spacer container region 23 and spacer 22 is positioned to lie between spacer mount 20 and wall 24 in spacer container region 23. The strap unit 18 defines an encasement region 26 in which a partly finished exhaust processor body 12 is positioned when exhaust processor body 12 is clamped. A partly finished exhaust processor body 12 is shown, for example, in FIG. 5 before insertion of body 12 in direction 13 into encasement region 26.

Before exhaust processor body 12 is placed within encasement region 26 of encasement machine 10, exhaust processor body 12 desirably is partially assembled. The substrate 28 may be in the form of a ceramic honeycomb substrate having an inlet end 29. The mat 30 may be in the form of a support or anchor mat 30 wrapped around substrate 28, and the outer case 32 as shown, for example, in FIGS. 1 and 13. The substrate 28 may be a single block, or it may be implemented as two or more separate blocks or units which may be arranged axially together or axially spaced. Mat 30 may be made of an intumescent material or other suitable substrate support material.

The substrate 28 and mat 30 may be positioned within outer case 32 using any suitable technique. The case 32 may be in a loose, open-sided form so that substrate 28 and mat 30 may be slid within case 32. The case 32 desirably includes spaced-apart first and second ends 34, 36. First end 34 may be flared upwardly compared to second end 36 as shown in FIG. 5. The loose case 32 may be formed by bending a generally flat metal sheet.

Once substrate 28 and mat 30 are positioned within case 32, the substrate 28, mat 30, and case 32 are collectively referred to as exhaust processor body 12. The exhaust processor body 12 is placed within encasement machine 10 to press and wrap case 32 around substrate 28 and mat 30 and firmly hold case 32 so that it can be welded or otherwise finished after the gap between the substrate 28 and case 32 has been measured and adjusted to fall within an acceptable tolerance range.

The strap unit 18 may be made of metal (for example, steel) and arranged in a generally circular configuration. The strap unit 18 desirably includes spaced-apart ends 38, 40 that are turned away from each other to define a jaw gap 42 as shown, for example, in FIG. 5. Each of the jaws 14, 16 desirably have tips or lugs 44 around which ends 38, 40 of strap unit 18 pass, and to which ends 38, 40 are secured by bolts 60 on an upper surface of each jaw 14, 16. The term "strap" as used in this application is intended to be interpreted broadly, and includes any suitable device(s) or member(s) for bracing or embracing the sheet metal case. As an example, the strap may be formed by a flexible (or capable of flexing) wall or sheet, or by a plurality of discrete parallel filaments, or by a web, or a chain. The strap may be, for example, a band, plate, or loop for binding objects together or for clamping an object in position.

As shown, for example, in FIG. 5, the gap measurer 212 measures the gap between substrate 28 and outer case 32 instantaneously in real time as clamping machine 210 is being used to clamp outer case 32 around mat 30 wrapped around substrate 28 (operation of clamping machine 210 will be described in more detail below) and, if necessary, also adjusts the clamping pressure of the clamping machine 210. The gap measurer 212 may have any suitable form.

In a preferred embodiment, the gap measurer 212 is in the form of a vision system that includes a camera and the clamping pressure control system 214 having a control unit that is programmed to use the gap measurements to control the clamping pressure control system. The clamping pressure control system 214 desirably is coupled to the clamping machine 210 and the welder 90A and is adapted to signal the clamping machine to adjust the clamping pressure and to signal the welder to begin welding. For example, the gap measurer 212 desirably includes an IN-SIGHT 2000 vision system available from Cognex Corporation that includes a camera and a control unit. It is within the scope of this disclosure to use any vision system, a digital camera, a laser, an optical system, or other distance measuring means to measure the gap between substrate 28 and outer case 32.

Gap measurer 212 takes gap measurements at, for example, nine preset locations 201–209 around the circumference of substrate 28 as shown in FIG. 2, and these gap measurements are averaged to obtain a single derived GBD dimension that characterizes the gap between substrate 28 and outer case 32 (and therefore the thickness and density of the mat 30 compressed between substrate 28 and outer case 32).

The gap measurer 212 will then desirably use the gap measurement and make mathematical calculations based on average minimum, maximum, mean, and mode in real time to evaluate the adjustments needed to bring this gap to within specification. The measurements/calculations will then provide feedback to the clamping machine 210 on the tourniquet-wrap machine 10 to adjust the band 18 to create the correct gap inside exhaust processor body 12 between substrate 28 and outer case 32. This system could also be used to signal individual points that were out of spec (too wide or narrow). This will signal the operator to adjust the contour of the can to correct the individual points.

The gap measurer 212 desirably compares the single derived GBD dimension to a specification defining a "predetermined dimension range" to determine whether or not the single derived GBD dimension falls within an acceptable tolerance range. If so, gap measurer 212 instructs welder 90 to apply weldment 33 (see FIG. 2) to weld lip 174 on one end 170 of outer case 32 to another end 172 of outer case 32 to fasten outer case 32 in a fixed position around substrate 28 and mat 30 to establish a fixed GBD dimension for the welded exhaust processor body 12 that falls within the acceptable tolerance range. If not, gap measurer 212 actuates its clamping pressure control system 214 coupled to clamping machine 210 and causes system 214 to operate and vary the clamping pressure applied by clamping machine 210 to the exhaust processor body 212 being manipulated by encasement machine 10 to either "tighten" or "loosen" outer case 32 with respect to substrate 28 and mat 30 to cause the single derived GBD dimension to be changed until it falls within the acceptable tolerance range. Once an acceptable single derived GBD dimension is achieved, gap measurer 212 instructs welder 90 to weld lip 174 on one end 170 of outer case 32 to another end 172 of outer case 32 (or such welding is accomplished manually), thereby establishing a fixed GBD dimension for the welded exhaust processor body 12 that falls within the acceptable tolerance range.

Encasement machine 10 includes data storage unit 213 configured to store, for example, the last thirty single derived GBD dimensions computed by gap measurer 212 for the preceding thirty exhaust processor bodies clamped in encasement machine 10. If the single derived GBD dimension computed by gap measurer 12 begins to trend either "downwardly" to the lower side of the tolerance range or "upwardly" to the upper side of the tolerance range, gap measurer 212 using information stored in data storage unit 213 will operate to manage clamping pressure control system 214 to cause the single derived GBD dimension to move back to the center of the tolerance range.

In operation, a ceramic substrate 28 desirably is wrapped manually with a mat 30. Once mat 30 is secured around substrate 28, it is then inserted manually into the outer case 32. The substrate 28, mat 30, and outer case 32 is then loaded manually into the tourniquet-wrap machine 10. At this point, the exhaust processor body finishing process is automated. Once the operator starts the cycle on machine 10, the band 18 pulls the exhaust processor body 12 to a preset pressure. Once the pressure setting is achieved, gap measurer 212 will measure the gap or distance between the outer case 32 and substrate 28. The gap is also the thickness of mat 30 in this condition.

Gap measurer 212 will measure the gap in nine preset locations around the circumference of the substrate 28. These nine measurements will be averaged to obtain one common value called the Gap Bulk Density (GBD). This GBD is then compared to a tolerance range. If the GBD is within the tolerance range, the seam on the outer case 32 will be TIG-welded in two spot locations to hold it in the current state. If the GBD falls outside the tolerance range, the machine 10 will adjust the pressure at which the substrate 28 is held and remeasure.

The spacer 22 provided in clamping machine 210 includes a plurality of elongated spacer members 46 secured to spacer mount 20 by nuts and bolts 48 as shown, for example, in FIG. 5. Each of the elongated spacer members 46 include an inner surface 52 facing wall 24, a pointed outer end or surface 54 engaging spacer mount 20, and a side surface 56. Any suitable mounting device or connector may be used to mount elongated members 46 to spacer mount 20. Such connectors may include, for example, clips, screw-threaded fasteners, lugs, and slide channels.

Spacer 22 permits encasement machine 10 to tighten and clamp cases 32 having a contour different than the contour of spacer mount 20 closely and accurately. For example, in the illustrated embodiments, spacer mount 20 is circular or near-circular shaped as shown in FIGS. 5–8 and 10. The exhaust processor body 12 to be clamped by encasement machine 10 is generally oval-shaped or non-circular shaped as shown, for example, in FIGS. 5, 8, and 10. The inner surface 52 of spacer members 46 includes an oval-shaped contour for receiving and tightening exhaust processor body 12 illustrated in FIG. 6.

It is not necessary to provide different encasement machines 10 to produce each type, shape, and contour of exhaust processor body 12 because a different type, shape, and contour of spacer 22 can be used in encasement machine 10 to match the strap unit 18 in size and shape to a particular exhaust processor body 12 to be clamped in strap unit 18. Furthermore, spacer 22 avoids the need to design a specially shaped spacer unit for each shape of exhaust processor. The spacer mount 20 can have a standard shape, for example circular or near circular, and be adapted to the shape of exhaust processor body 12 by spacer 22.

The wall 24 is positioned to lie adjacent to inner surface 52 of elongated spacer members 46. The wall 24 is made of metal (e.g. steel) and is coupled to spacer mount 20. The spacer mount 20 and wall 24 include spaced-apart ends 58, 59 that wrap over tips of jaws 14, 16 and are coupled to jaws 14, 16 by bolts 60.

The wall 24 serves to smooth the contour of the contact pressure exerted on exhaust processor body 12 when elongated spacer members 46 do not form a continuous pressure surface over exhaust processor body 12. Size variations in a particular substrate 28 and mat 30 can result in variation in the size of case 32, and the spacers 46 may be spaced apart a small distance to allow for such variation in size about an average size. Also, strap unit 18 includes regions 62 in which no spacer 46 is positioned between spacer mount 20 and wall 24 due to the small space available between spacer mount 20 and wall 24. In these regions 62, the wall 24 ensures that a smooth pressure is applied to exhaust processor body 12. The wall 24 also serves to reduce wear of spacer 22 and to reduce strain on spacer mount 20. A small spacer may be used in these regions 62. The wall 24 may be removed so that spacer 22 bears directly against case 32.

Figure 9:
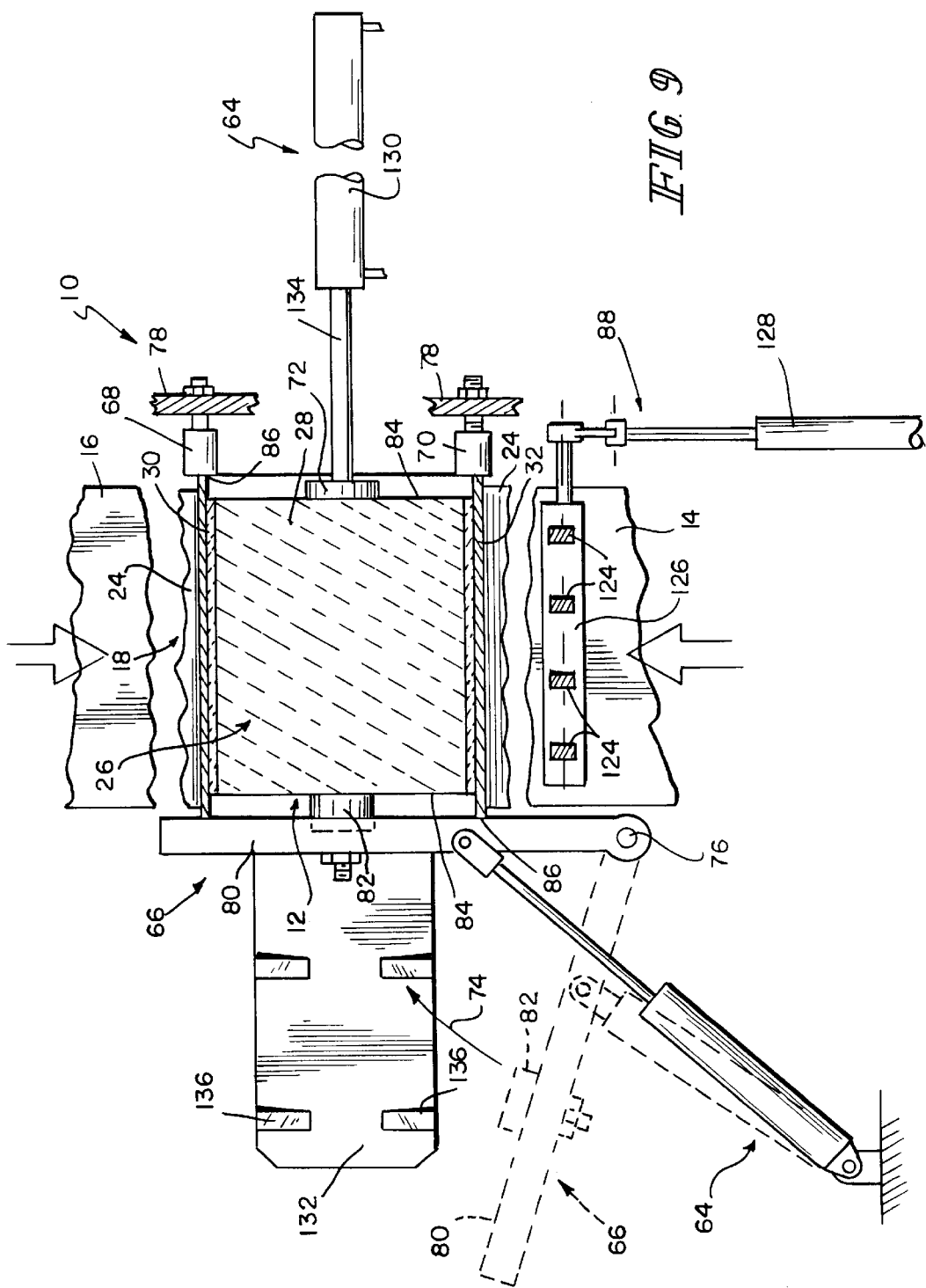
FIG. 9 is a top plan view, with portions broken away, of the exhaust processor body of FIGS. 5–8 positioned in the strap unit and between the spaced-apart jaws showing an exhaust processor body positioner included in the encasement machine and configured to position the exhaust processor body properly within the encasement region formed in the encasement machine.

The exhaust processor body 12 is slid into encasement region 26 defined by strap unit 18 when jaws 14, 16 are in a spaced-apart position so that strap unit 18 is relaxed as shown, for example, in FIGS. 8 and 9. The encasement machine 10 further includes an exhaust processor body positioner 64 that positions exhaust processor body 12 within encasement region 26 properly. Exhaust processor body positioner 64 includes an arm 66 and stops 68, 70, 72. Arm 66 cooperates with stops 68, 70, 72 to position exhaust processor body 12 properly in encasement region 26 and position substrate 28 properly relative to outer case 32.

After exhaust processor body 12 is positioned in encasement region 26 of encasement machine 10, arm 66 swings in direction 74 about axis 76 so that arm 66 abuts exhaust processor body 12. Arm 66 cooperates with stops 68, 70, 72 to position exhaust processor body 12 properly in encasement region 26 of encasement machine 10 and position substrate 28 relative to outer case 32. Stops 68, 70 are fixed to a movable plate 78 and engage outer case 32 as shown in FIG. 9. Stop 72 is movable relative to stops 68, 70 and engages substrate 28. Arm 66 includes a flat plate 80 and a stop 82 that is coupled to and movable relative to flat plate 80. Stop 82 of arm 66 engages substrate 28 and flat plate 80 engages outer case 32.

Stops 68, 70, 72, 82 and flat plate 80 position substrate 28 within outer case 32 so that edges 84 of substrate 28 are spaced apart from edges 86 of outer case 32 by a specified distance. The movable plate 78 is movable to accommodate exhaust processor bodies 12 of different sizes. Stops 68, 70 and flat plate 80 that engage outer case 32 are made of a metal material and stops 72, 82 that engage substrate 28 are made of a nylon material. The stops and flat plate may be made of any type of material that will not damage the outer case or substrate.

Figure 10:
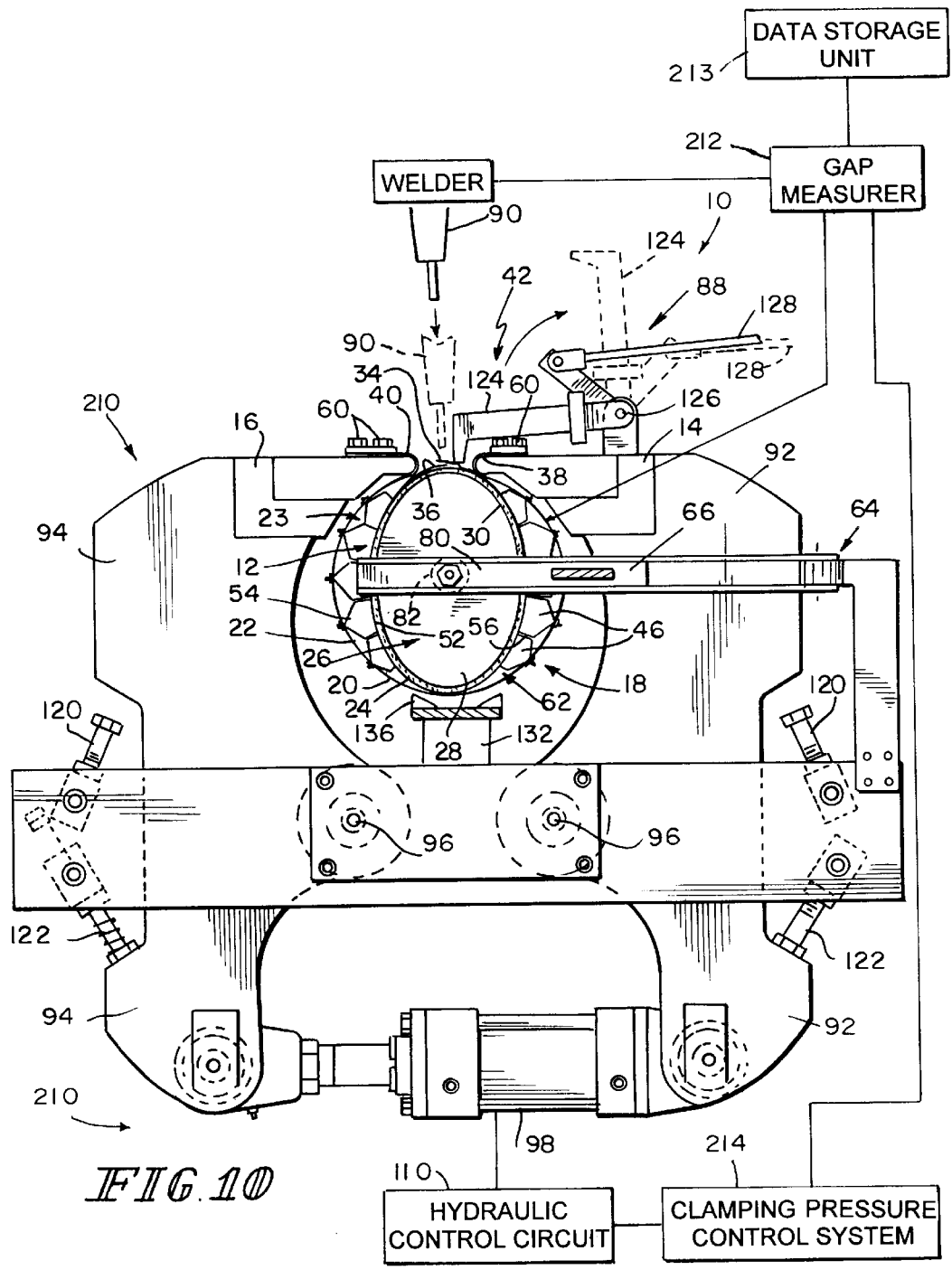
FIG. 10 is a side elevation view similar to FIG. 8 showing the spaced-apart jaws in a compressed position so that the strap unit clamps and wraps the outer case around the mat and substrate, a mechanism swinging down onto the outer case to hold ends of the outer case in a fixed position, and a welder coupling the ends of the outer case to each other after the gap measurer has determined that the gap between the substrate and the outer case falls within the predetermined dimension range.

After exhaust processor body 12 is positioned properly within encasement region 26 of encasement machine 10, the jaws 14, 16 move toward each other so that strap unit 18 moves from a relaxed position to a tightened position to clamp exhaust processor body 12 as shown in FIG. 10. As strap unit 18 tightens, the outer case 32 is compressed circumferentially, such that flared end 34 of outer case 32 overlaps confronting end 36 of outer case 32 and outer case 32 is wrapped tightly around substrate 28. Jaws 14, 16 and strap unit 18 are some of the components included in the clamping machine 210.

Encasement machine 10 may further include a mechanism 88 that engages flared end 34 to hold flared end 34 on the other end 36 of case 32 as shown in FIGS. 5, 6, and 10. The mechanism 88 engages flared end 34 after flared end 34 of case 32 overlaps the other end 36 of case 32. The mechanism 88 moves from the position shown in dotted lines to the position shown in solid lines to engage flared end 34 as shown in FIG. 10.

Encasement machine 10 further includes a welder 90 as shown in FIGS. 5, 6, and 10. Once flared end 34 is held securely against the other end 36 of case 32, welder 90 couples ends 34, 36 of case 32 to provide a tightly wrapped exhaust processor body 12.

Clamping machine 210 is used to clamp outer case 32 around the mat 30 that is wrapped around substrate 28. The jaws 14, 16 are operated by levers 92, 94, respectively, mounted by pivots 96. The levers 92, 94 are driven by a hydraulic cylinder 98. Pressurized fluid is supplied to hydraulic cylinder 98 by a hydraulic control circuit 110, which includes a control valve 112, a pressure sensor 114, and a reservoir 116 as shown in FIG. 8. The fluid is supplied to circuit 110 from a pressurized fluid source 118 such as, for example, a hydraulic power pack (reservoir and pump). The jaws may be operated by any suitable driver or power mechanism including, for example, a pneumatic cylinder.

Clamping pressure control system 214 operates to change the position of strap unit 18 to cause outer case 32 to be tightened or loosened so that the gap between substrate 28 and outer case 32 falls within an acceptable tolerance range before welder 90 is operated to fasten outer case 32 in place. The jaws 14, 16, levers 92, 94, hydraulic cylinder 98, and hydraulic control circuit 110 comprise an actuator that moves strap unit 18 between a relaxed position and a clamped position. Gap measurer 212 determines the gap and actuates clamping pressure control system 214 and welder 90 under the proper conditions to establish a proper gap between substrate 28 and outer case 32 and therefore cause the substrate support mat 30 wrapped around the substrate 28 and positioned to fill the gap between substrate 28 and outer case 32 to be in compliance with a predetermined Gap Bulk Density specification applicable to mat 30.

When jaws 14, 16 are in the compressed position shown in FIG. 10, the outer surface 54 of spacer members 46 have a circular or near circular contour to match the contour of spacer mount 20 and the inner surface 52 of spacer members 46 have a contour that matches the cross-sectional shape or contour of exhaust processor body 12 to be wrapped or clamped by encasement machine 10. The spacer 22 ensures that an appropriate surface contact pressure is applied to case 32 during tightening or clamping to suit the shape of substrate 28. The spacer 22 is configured to apply a substantially radially-inwardly directed force to case 32 from the circular, or near circular, spacer mount 20. The spacer 22 may be made of any suitable material able to bear the clamping pressure without distortion. For example, the spacer may be made of a brass/bronze alloy, and machined or electro-sculpted using computer-aided design apparatus.

Any cross-sectional shape of substrate 28 can be accommodated simply by using a spacer 22 of the correct contour to match the contour of substrate 28. The spacer 22 may be replaced individually or separate from spacer mount 20 and wall 24 (leaving spacer mount 20 and wall 24 in place) or an entire strap unit 18 might be replaced. Thus, different strap units 18 may be provided for different exhaust processor bodies 12 having substrates 28 of varying cross section or contour. To start production of a batch of exhaust processor bodies 12 of any particular type, it is a simple matter to install the appropriate strap unit 18 or spacer 22 in encasement machine 10. The jaws 14, 16 may also be replaced with strap unit 18 to accommodate different size and contoured exhaust processor bodies 12. If either or both of jaws 14, 16 is replaced with strap unit 18 to accommodate different size and contoured exhaust processor bodies 12, then jaws 14, 16 are considered to be part of strap unit 18.

The encasement machine 10 may be operated to tighten case 32 either to a fixed size or to a fixed pressure. It is preferred to tighten case 32 to a fixed pressure, and thus achieve a controlled compression force on mat 30 and substrate 28. The controlled compression force ensures that mat 30 is mounted under optimum conditions to perform its function in supporting substrate 28 securely to prevent substrate 28 from moving, but without crushing substrate 28, and to seal around the circumferential periphery of substrate 28. The case 32 has to have a tight, controlled pressure fit around substrate 28 and mat 30 to ensure that substrate 28 is held securely in position without leaks, around the periphery of substrate 28, and to ensure that substrate 28 does not move under the effects of axial flow pressure, and mechanical vibration and knocks, when in use. Gap measurer 212 and clamping pressure control system 214 cooperate with clamping machine 210 and welder 90 to vary the clamping pressure on outer case 32 automatically before outer case 32 is welded to either tighten or loosen outer case 32 with respect to substrate 28 and mat 30 to cause the gap to fall within an acceptable tolerance range.

To tighten case 32 to a controlled pressure, the valve 112 is opened until the hydraulic pressure detected by sensor 114 reaches a predetermined level corresponding to the desired tightening pressure of case 32. This predetermined hydraulic pressure can be calculated easily, taking into account the mechanical advantage of the pivoted levers 92, 94. Once the predetermined pressure has been reached, the control valve 112 is closed to prevent possible damage from being caused by over-tightening case 32.

It has been observed that, when compressed, the mat 30 will tend to give, or collapse, over a period of time, such that, after the initial closing (or bracing) of jaws 14, 16, the jaws 14, 16 will creep further closed as mat 30 gives under the applied hydraulic pressure. This gradual relaxing of mat 30 has been observed to last for up to about 15 seconds (possibly up to 30 seconds), after which mat 30 stabilizes under the applied load. The reservoir 116 ensures that the hydraulic pressure within cylinder 98 does not drop below a desired minimum as mat 30 continues to relax after valve 112 has been turned off. The reservoir 116 has sufficient capacity to compensate for hydraulic pressure drops which might otherwise occur within cylinder 98 as jaws 14, 16 and levers 92, 94 creep during the "stabilization" of mat 30 under load.

The following technique may be employed to compensate for the "stabilization" of mat 30. For example, an electronic feedback circuit may be used in the hydraulic control circuit to monitor the hydraulic pressure and to open the control valve to admit more gas if the hydraulic pressure drops below a predetermined threshold. The encasement machine 10 may be operated repeatedly, or cycled several times, before removing the exhaust processor body 12 from encasement machine 10, until no further creeping, or collapsing, of mat 30 is observed. Jaws 14, 16 may be driven by other drive arrangements, for example, electric motors. It is preferred that such other drive arrangements compensate for creep of mat 30, for example, in a similar manner to the techniques described above.

Although a particular arrangement employing jaws 14, 16 has been illustrated for tightening the clamping strap unit 18, any suitable tightening device coupled to the strap may be used. When jaws are used, one of the jaws may, if desired, be fixed in position, such that the tightening is achieved by movement of the non-fixed jaw.

The travel limit positions of jaws 14, 16 are controlled by adjustable stops 120, 122. Two stops 120 define the maximum open position of jaws 14, 16, and two further stops 122 define the maximum closed position of jaws 14, 16.

When jaws 14, 16 begin to be moved toward each other, the mechanism 88 remains in a retracted position as shown in dotted lines FIG. 10, to remain out of contact with case 32. The initial closing movement of jaws 14, 16 causes ends 34, 36 of case 32 to overlap, but to remain spaced above, and out of contact with mat 30 and substrate 28.

Mechanism 88 includes a plurality of fingers 124, a support bar 126, and an actuator 128 that moves fingers 124 in and out of jaw gap 42 defined by ends 38, 40 of strap unit 18 and engagement with flared end 34. Mechanism 88 is coupled to jaw 14 and moves with jaw 14 as jaw 14 compresses and releases exhaust processor body 12.

When a suitable intermediate clamping position of the jaws 14, 16 is reached, the mechanism 88 is actuated to cause fingers 124 to press on flared end 34 of outer case 32 during the final closing movement of the jaws 14, 16. The fingers 124 press flared end 34 of case 32 inwardly against opposing end 36 of case 32 to cause ends 34, 36 of case 32 to slide relative to each other. Fingers 124 press overlapping ends 34, 36 of outer case 32 against mat 30 as shown in FIG. 8. The mechanism 88 could be moving during the whole closing process of jaws 14, 16, but only make contact with flared end 34 of case 32 during the final part of the closing movement of jaws 14, 16. The mechanism 88 typically contacts case 32 for the final quarter of the closing movement of jaws 14, 16. The mechanism 88 could be coupled to be driven by movement of jaws 14, 16 or mechanism 88 might be driven by a hydraulic cylinder (not shown) coupled to hydraulic circuit 110 shown in FIG. 9.

Although substrate 28 and mat 30 are produced to fairly good production tolerances, the possible size variations of each, and the unpredictable relaxation of mat 30 during compression to a controlled pressure, mean that the overall size of case 32 after tightening, may vary within considerable limits. This variation in size is accommodated by flared end 34 of case 32 which provides a sliding overlap joint with the confronting edge 36 of case 32.

Once case 32 has been tightened and mat 30 has stabilized, the case 32 is welded to secure case 32 in its tightened condition. The jaw gap 42 between ends 38, 40 of strap unit 18 permits good access to perform the welding operation. In one production method, the case 32 is not welded completely along the length of case 16 while in encasement machine 10, but is simply spot welded at one or more locations, depending on the axial length of the case 32. The spot welds simply serve to hold case 32 in its tightened position until the case 32 is later permanently welded. While exhaust processor body 10 is in encasement machine 10, the spot welding may be performed manually, or by welder 90 as shown in FIG. 5. The case 16 can be welded along its entire length while still in encasement machine 10. The welding can be performed manually, or by welder 90 which is lowered into jaw gap 42 and moved along the length of case 32.

Figure 11:
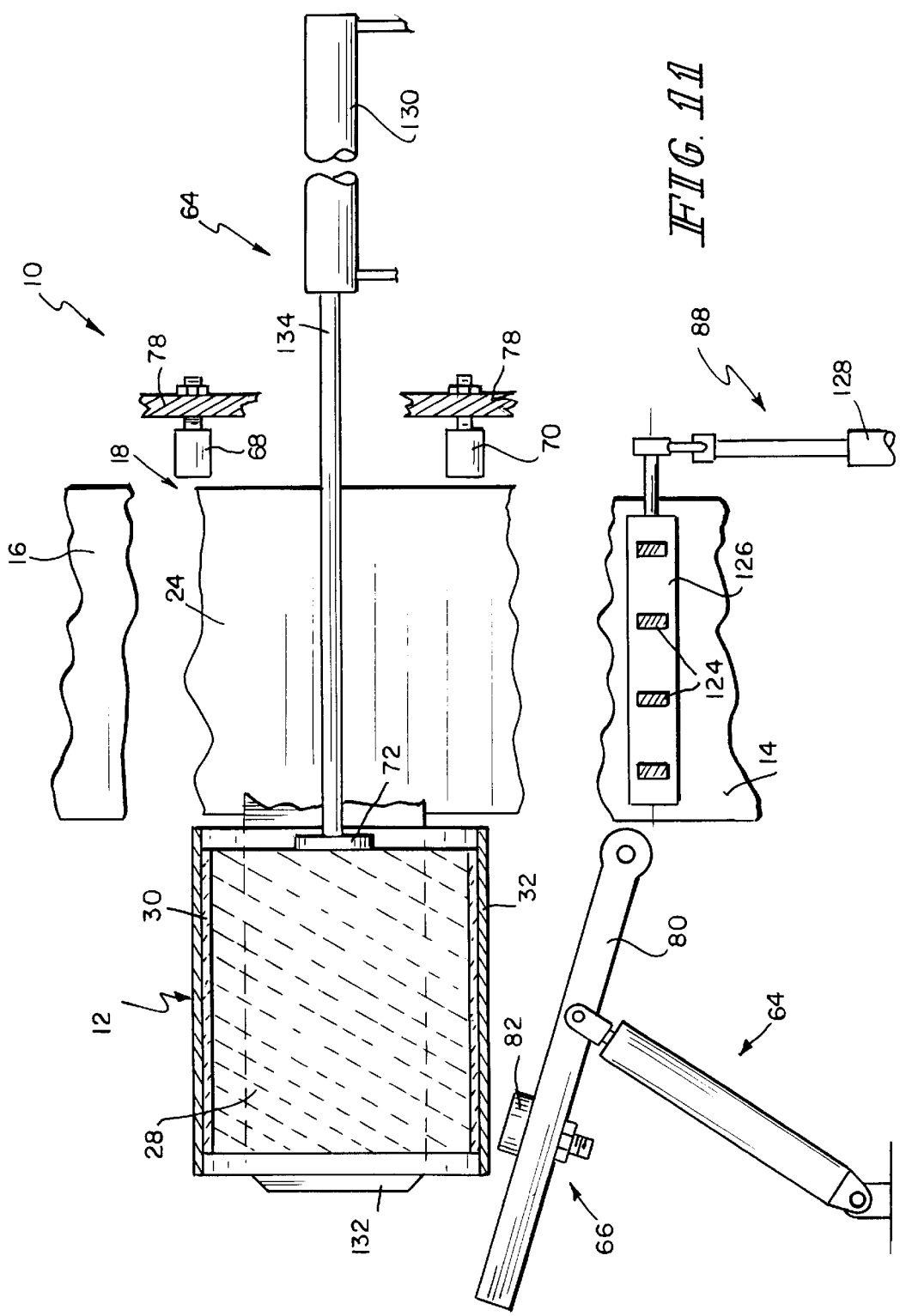
FIG. 11 is a top plan view, with portions broken away, showing the exhaust processor body being ejected or pushed out of the encasement region defined by the strap unit and onto a shelf.

Encasement machine 10 further includes an ejector mechanism 130 which pushes exhaust processor body 12 onto a shelf 132 as shown, for example, in FIG. 11. Shelf 132 includes ramps 136 that support exhaust processor body 12 as shown, for example, in FIG. 9. The ejector mechanism 130 includes a driver 134 that is coupled to stop 72. During the ejection process, stop 72 extends into encasement region 26 to push exhaust processor body 12 onto shelf 132.

The exhaust processor body 12 is part of an exhaust processor 140 as shown in FIG. 13. Exhaust processor 140 includes exhaust processor body 12 and end caps 142 shown in phantom in FIG. 13. The end caps 142 are generally cone (or frusto-cone) shaped and are formed to include ports 144 to enable exhaust processor 140 to be installed in a vehicle exhaust system.

In this application, the words "exhaust processor" are intended to refer to various types of diesel particulate filters and other traps, purifiers, or substrates in connection with which this invention may be used. In connection with the illustrated embodiment, the words "exhaust processor" specifically refer to a catalytic device (for example, a catalytic converter or a catalytic trap) for use with gasoline engines.

Figure 12:
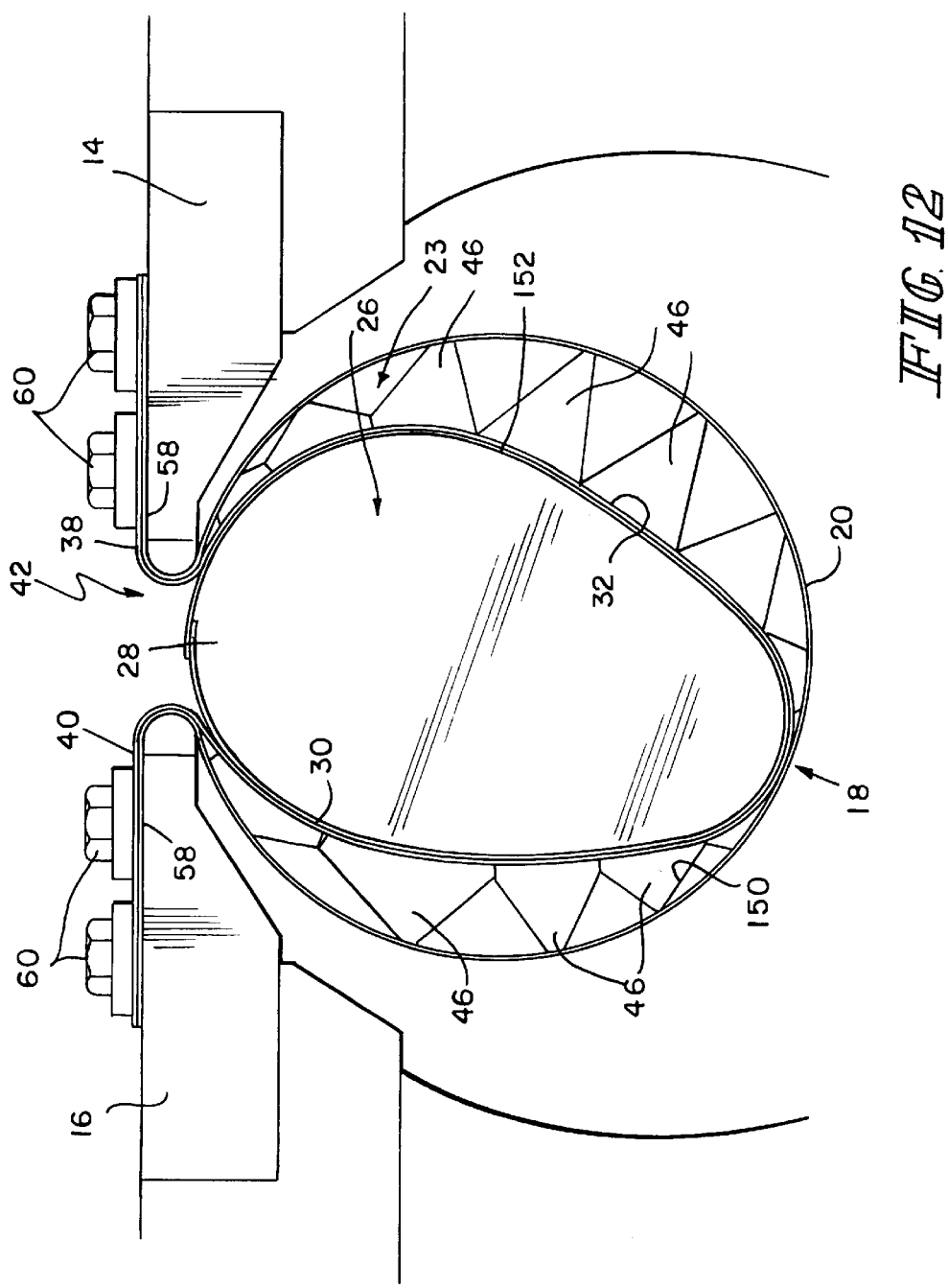
FIG. 12 is a side elevation view of another strap unit including a set of spacers that are shaped and sized differently from the spacers shown in FIGS. 5, 6, 8, and 10, the strap unit being coupled to the spaced-apart jaws and arranged to clamp an exhaust processor body received in the encasement region of the encasement machine, the strap unit having spacers sized to have a contour in the compressed position that is substantially identical to the contour of the exhaust processor body being clamped by the encasement machine.

As discussed above, the encasement machine 10 may clamp exhaust processor bodies 12 of various size and contour by adjusting the size and contour of spacer 22. For example, encasement machine 10 may include a spacer 150 that is sized, shaped, and contoured to clamp a non-symmetrical polygonal type cross section shape or contour exhaust processor body 152 as shown in FIG. 12. The spacer mount 20 of strap unit 18 is circular or near circular, and this maintains an optimum radial, or near radial, force on exhaust processor body 152 during compression.

Figure 14:
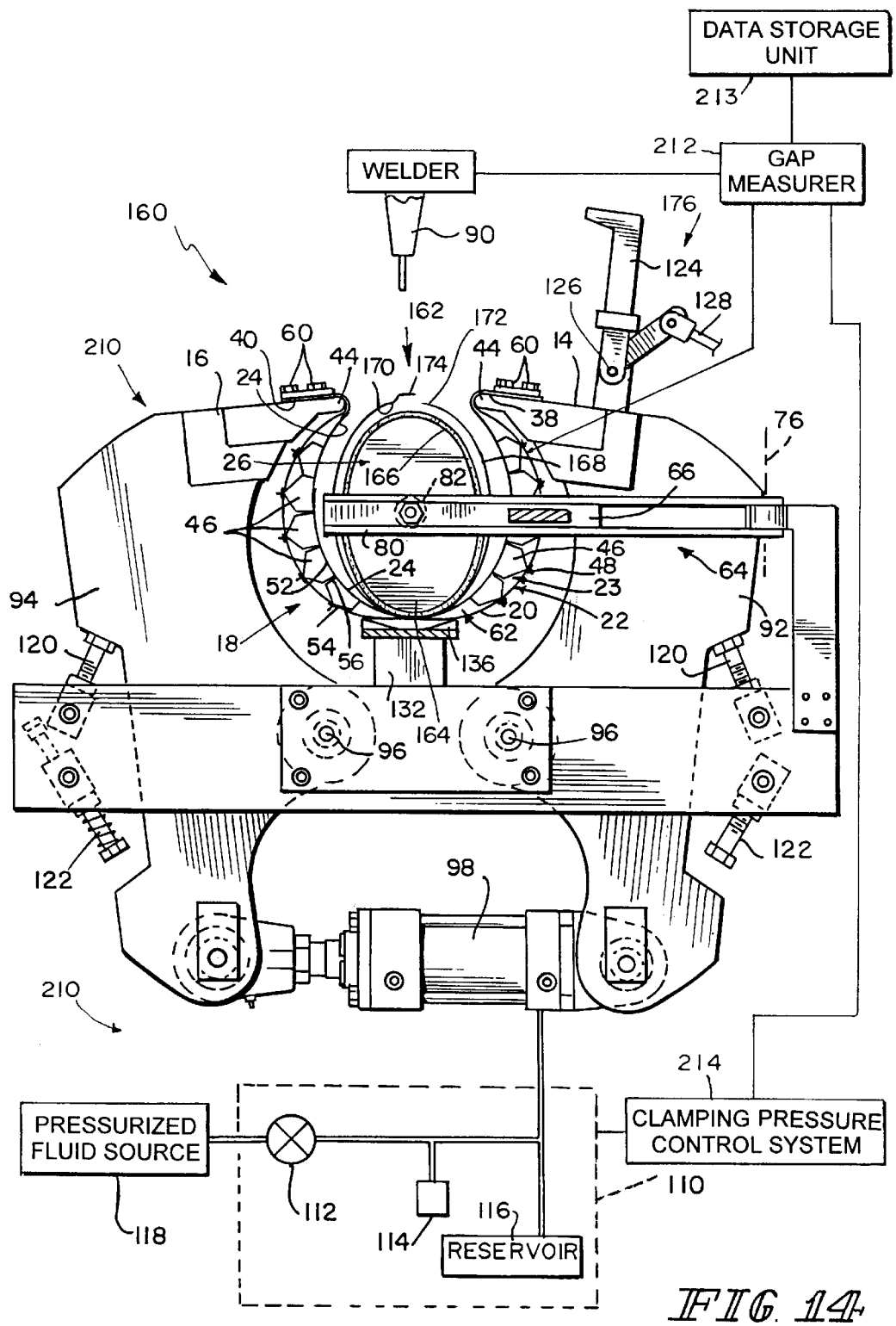
FIG. 14 is a side elevation view of an alternative embodiment of an encasement machine and an exhaust processor body positioned to lie between space-apart jaws of the encasement machine.
Figure 15:
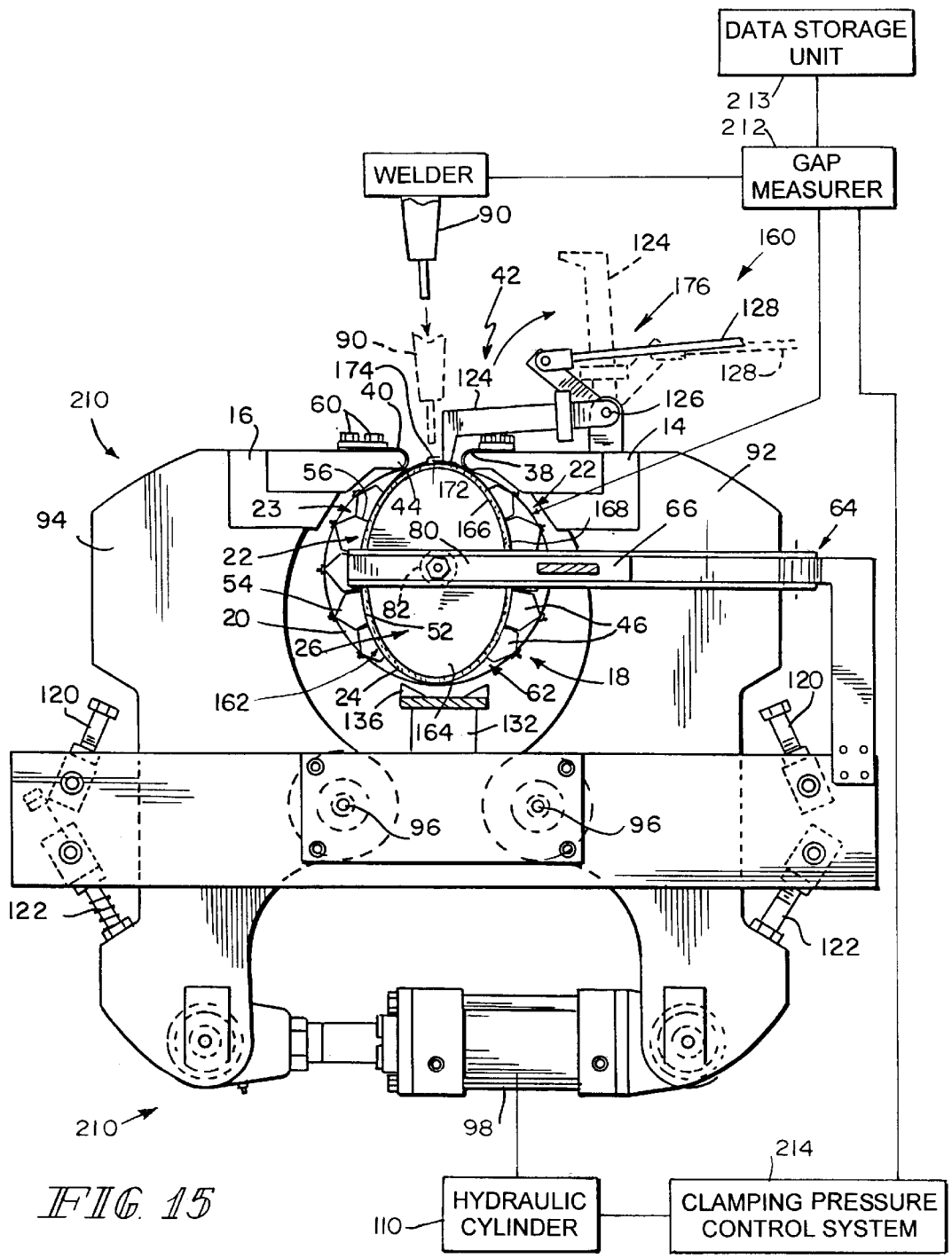
FIG. 15 is a side elevation view similar to FIG. 14 showing the spaced-apart jaws closed to clamp the outer case around the mat and substrate so that the raised lip of the outer case overlaps the other end of the outer case, a mechanism engaged with an end of the outer case and abutting the raised lip of the outer case, and a welder coupling the ends of the outer case after the gap measurer has determined that the gap between the substrate and the outer case falls within the predetermined dimension range.

Another preferred encasement machine 160 that clamps an exhaust processor body 162 is shown in FIGS. 14 and 15. Encasement machine 160 is identical to encasement machine 10 except that encasement machine 160 includes a mechanism 176 that interacts with exhaust processor body 162 in a different manner than mechanism 88 of encasement machine 10 interacts with exhaust processor body 12. All other components of encasement machine 10 are identical to encasement machine 160 and are numbered identically.

The exhaust processor body 162 includes a substrate 28, a mat 30, and an outer case 32 as shown in FIG. 1. The outer case 168 includes spaced-apart ends 170, 172 and one of the ends 170 is lifted or bent to form a lip 174. The lip 174 may, for example, be formed by pressing the sheet metal along an edge prior to bending the sheet metal into case 168. Substrate 164, mat 166, and outer case 168 are assembled as described above in reference to exhaust processor body 12. The exhaust processor body 162 is positioned within encasement region 26 of encasement machine 10 in the same manner as exhaust processor body 12.

When case 168 is tightened and clamped by jaws 14, 16 and strap unit 18, lip 174 of end 170 overlaps the other confronting end 172 of case 168. The mechanism 176 holds end 172 of case 168 down as strap unit 18 clamps outer case 168 about mat 166 and substrate 164 and lip 174 overlaps end 172. The components of mechanism 176 are identical to the components of mechanism 88 of encasement machine 10 and are numbered identically. The difference between mechanisms 88, 176 is that fingers 124 of mechanism 176 engage the end 172 of outer case 168 that is overlapped by the other end 174 of case 168 and fingers 124 of mechanism 88 engage the end 34 of outer case 32 that is overlapping the other end 36 of outer case 36.

The mechanism 176 also provides the secondary function of maintaining the position of lip 174 adjacent to jaw gap 42 defined between ends 38, 40 of strap unit 18 so that welder 80 has access to lip 174. Mechanism 176 can act as a stop if lip 174 abuts fingers 124 during the clamping process to prevent lip 174 from rotating away from gap 42.

Figure 16:
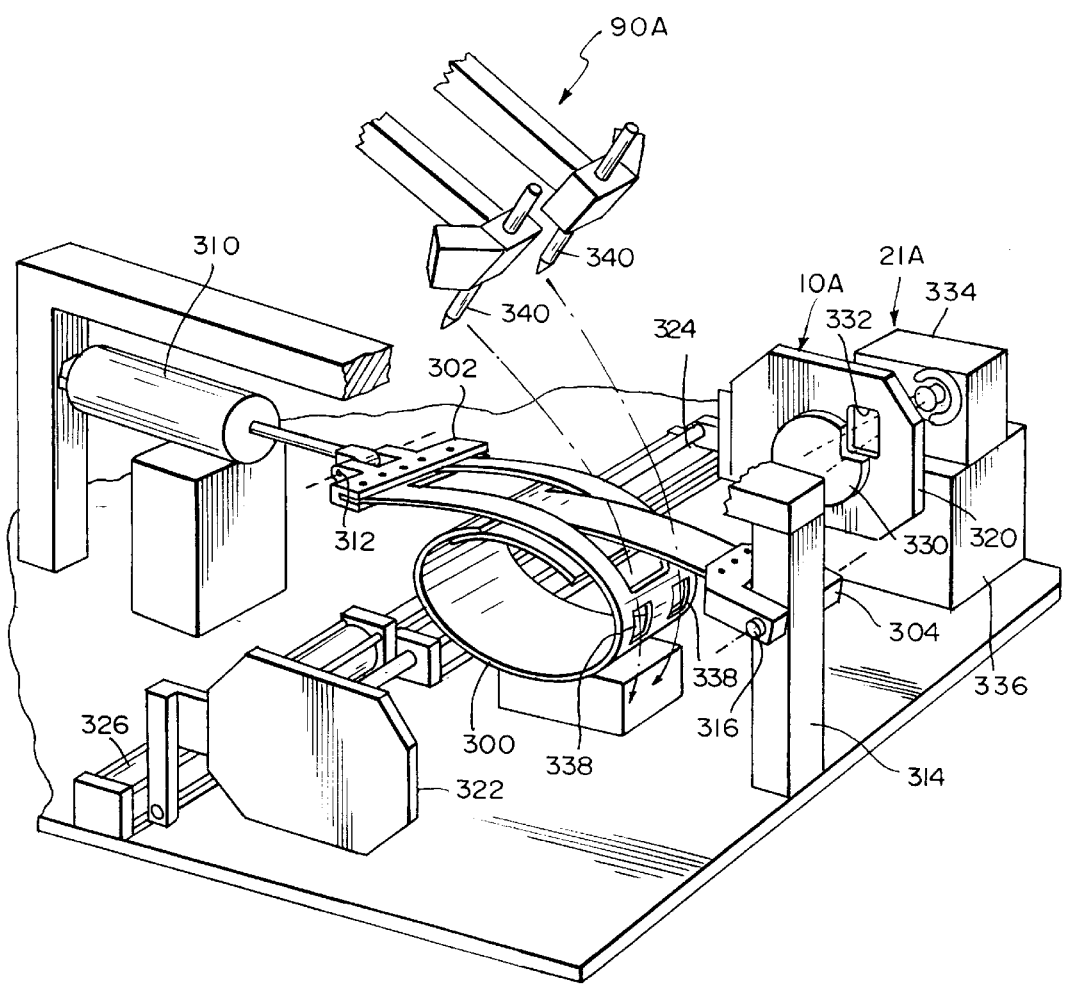
FIG. 16 is a partial exploded and partial perspective view of an encasement machine in accordance with an other embodiment of the invention and an exhaust processor body.

In accordance with alternative embodiments of the invention, the encasement machine 10, the welder 90 and the gap measurer 212 may have any other suitable constructions and configurations. In the embodiment of FIG. 16, for example, the encasement machine 10A has a strap unit that includes a wrap band 300 secured to a pair of opposed clamps or jaws 302 and 304. In the illustrated embodiment, the jaw 302 is pivotally connected to a wrap piston 310 by a pivot pin 312, and the jaw 304 is pivotally connected to a stanchion 314 by a pivot pin 316. The encasement machine 10A also includes first and second compression plates 320 and 322 and corresponding first and second compression plate pistons 324 and 326. The first compression plate 320 includes a cartridge positioning pad 330 and also defines a viewing access window 332.

In the embodiment of FIG. 16, the illustrated gap measurer 212A includes a camera 334 and a control unit 336. The wrap band 300 defines a pair of windows 338 to facilitate welding of the exhaust processor body 12. The welder 90A may include an automated plasma welder having a pair of conventional plasma torches 340 extending from a pair of tracking arms 342 driven by a servo or the like. The welder 90A may instead use any other suitable welder that uses plasma to conduct welding in accordance with further alternative embodiments of the invention.

During operation, the compression plates 320 and 322 contact the substrate to align it for compression. The wrap piston 310 then pulls the wrap band 300 to apply a clamping pressure on the case. When the clamping pressure achieves the pre-set pressure, the compression end plates 320 and 322 retract. The gap measurer 212A then measures the gap size, preferably by taking several gap measurements and then arriving at a GBD. The gap measurer 212A compares the single derived GBD dimension to the specification defining a "predetermined dimension range" to determine whether or not the single derived GBD dimension falls within an acceptable tolerance range. If so, the gap measurer 212A instructs the welder 90A to apply weldment to weld lip 174 on one end of outer case 32 to another end 172 of outer case 32 to fasten outer case 32 in a fixed position around substrate 28 and mat 30 to establish a fixed GBD dimension for the welded exhaust processor body 12 that falls within the acceptable tolerance range. If not, gap measurer 212A actuates the clamping pressure control system 214 coupled to clamping machine 210A. This causes the control system to operate and vary the clamping pressure applied by clamping machine 210A to the exhaust processor body 12 being manipulated by encasement machine 10A to either "tighten" or "loosen" outer case 32 with respect to substrate 28 and mat 30 to cause the single derived GBD dimension to be changed until it falls within the acceptable tolerance range. Once an acceptable single derived GBD dimension is achieved, gap measurer 212A instructs welder 90A to weld lip 174 on one end 170 of outer case 32 to another end 172 of outer case 32 (or such welding is accomplished manually), thereby establishing a fixed GBD dimension for the welded exhaust processor body 12 that falls within the acceptable tolerance range.

In a preferred embodiment, the clamping pressure control system 214A controls the operation of the pistons 324 and 326, the wrap piston 310 and the welder 90A. In particular, for example, the control system 214A desirably initially signals the pistons 324 and 326 to move compression plates 324 and 326 toward the exhaust processor and then signals the wrap piston 310 to apply a pre-set clamping pressure to the exhaust processor. When the pressure is applied, the control system 214A signals the pistons 324 and 326 to retract the compression plates 324 and 326 and then signals the camera 324 of the gap measurer 212A to takes measurements in connection with the determination of the GBD. The measurements are then fed to the control system 214A for comparison with the GBD range. The result of the comparison then determines whether the pre-set clamping pressure should be adjusted or whether the welding should occur. In particular, if the GBD is outside the GBD range, the control system 214A sends a signal to the wrap piston 300 to change the clamping pressure. If the GBD is within the GBD range, the control system 214A signals the welder 90A to move the torches 340 into place and then signals the welder to effect welding.

Using an automated method of measuring the gap or GBD as disclosed herein in a tourniquet-wrap or other exhaust processor-producing machine provides a real time feedback loop to the tourniquet-wrap controller to allow and provide automated adjustment on the tension force of the strap unit or band 18 creating automated adjustments for varying conditions. As the size of substrate 28 varies, this gap measurement system allows encasement machine 10 to adjust band tension automatically. Also, as the band wears, the tension required to achieve the correct gap also varies. The gap measurement process disclosed herein automatically corrects for the wear of the band without any need to calculate the gap manually with calipers or with another measurement system after an outer case is welded in place around a substrate and mat.

Using the automated gap or GBD measuring system disclosed herein, the gap between the substrate and the outer case is determined and compared to nominal gap specifications. This calculated information is then used to make decisions to adjust the tension on the strap unit or band 18 used in the tourniquet-wrap machine. The gap calculation is processed in real time as each substrate is being "canned" (i.e., installed in an outer case). Feedback is provided in real time to adjust automatically the tension on the band to adjust for changing conditions. This method provides verification of gap or GBD for each exhaust processor body 12 while it is being manufactured to minimize or eliminate the need to rework any exhaust processor body 12 to make post-manufacture adjustments to check "push-out" or to change the gap or GBD associated with such an exhaust processor body 12.

Although the invention has been described and illustrated in detail with reference to preferred embodiments, it is to be clearly understood that the same is by way of illustration and example only, and is not to be taken by way of limitation. The spirit and scope of the present invention are to be limited only by terms of the following claims.

The claimed invention is:

1. An apparatus for producing an exhaust processor comprising:
    (a) a clamping device for applying a predetermined clamping pressure to clamp a first component of the exhaust processor about a second component of the exhaust processor to define a gap between the first component and the second component;
    (b) a measuring device for measuring a size of the gap during application of the predetermined clamping pressure, the measuring device including a clamping pressure control system for adjusting the predetermined clamping pressure of the clamping device in response to the gap measurement so that the gap size is within a predetermined range; and
    (c) a welder for welding a portion of the first component to an other portion of the first component when the gap size is within the predetermined range.

2. The apparatus of claim 1 wherein the measuring device includes a camera.

3. The apparatus of claim 1 wherein the welder comprises a plasma welder.

4. The apparatus of claim 1 wherein the control system signals the clamping device to adjust the clamping pressure if the size of the gap measured by the measuring device is outside the predetermined range.

5. The apparatus of claim 1 wherein the measuring device measures the size of the gap by taking gap measurements at a plurality of predetermined locations about the second component.

6. The apparatus of claim 5 wherein the measuring device averages the gap measurements to obtain the gap size.

7. The apparatus of claim 1 wherein the first component comprises a case and the second component comprises a substrate and wherein a mat is disposed about the substrate and substantially fills the gap.

8. An apparatus for producing an exhaust processor comprising:
    (a) a clamping device for applying a predetermined clamping pressure to clamp a first component of the exhaust processor about a second component of the exhaust processor to define a gap between the first component and the second component;
    (b) a measuring device for measuring a size of the gap during application of the predetermined clamping pressure, the measuring device including a camera and a clamping pressure control system for adjusting the clamping pressure of the clamping device in response to the gap measurement so that the gap size is within a predetermined range; and
    (c) a plasma welder for welding a portion of the first component to an other portion of the first component when the gap size is within the predetermined range.

9. The apparatus of claim 8 wherein the control system signals the clamping device to adjust the predetermined clamping pressure if the size of the gap measured by the measuring device is outside the predetermined range.

10. The apparatus of claim 8 wherein the measuring device measures the size of the gap by taking gap measurements at a plurality of predetermined locations about the second component.

11. The apparatus of claim 10 wherein the measuring device averages the gap measurements to determine the gap size.

12. The apparatus of claim 8 wherein the first component is a case and the second component is a substrate.

13. A method for producing an exhaust processor comprising the steps of:
    (a) applying a predetermined clamping pressure with a clamping device to clamp a first component of the exhaust component about a second component of the exhaust processor to define a gap between the first component and the second component;
    (b) measuring a size of the gap with a measuring device having a clamping pressure control system for adjusting the predetermined clamping pressure;
    (c) adjusting the clamping pressure with the clamping pressure control system if the measured size of the gap is outside a predetermined range; and
    (d) welding a portion of the first component to an other portion of the first component with a welder when the measured gap size is within the predetermined range.

14. The method of claim 13 wherein step (b) occurs during step (a).

15. The method of claim 13 wherein during step (b) the measuring device measures the size of the gap with a camera.

16. The method of claim 13 wherein during step (d) the welder generates plasma for welding the portion of the first component to the other portion of the first component.

17. The method of claim 13 wherein during step (b) the measuring device makes gap measurements at a plurality of predetermined locations about the second component.

18. The apparatus of claim 17 wherein the measuring device averages the gap measurements to determine the gap size.

19. The method of claim 13 wherein during step (b) the measuring device measures the size of the gap with a camera and wherein during step (d) the welder generates plasma for welding the portion of the first component to the other portion of the first component.

20. The apparatus of claim 13 wherein the first component comprises a case and the second component comprises a substrate and wherein a mat is disposed about the substrate and substantially fills the gap.

* * * * *